(12) United States Patent
Markle

(10) Patent No.: US 7,507,028 B2
(45) Date of Patent: Mar. 24, 2009

(54) BEARING RETAINER ASSEMBLY AND METHOD

(75) Inventor: Stephen L. Markle, Holley, NY (US)

(73) Assignee: SPX Corporation, Charlotte, NC (US)

( * ) Notice: Subject to any disclaimer, the term of this patent is extended or adjusted under 35 U.S.C. 154(b) by 31 days.

(21) Appl. No.: 11/166,244

(22) Filed: Jun. 27, 2005

(65) Prior Publication Data

US 2006/0291763 A1  Dec. 28, 2006

(51) Int. Cl.
*F16C 33/38* (2006.01)

(52) U.S. Cl. ................... 384/523; 384/470; 384/528; 384/530

(58) Field of Classification Search .............. 384/470, 384/528, 530, 523
See application file for complete search history.

(56) References Cited

U.S. PATENT DOCUMENTS

| | | | | |
|---|---|---|---|---|
| 1,712,222 A | * | 5/1929 | Linde | 384/529 |
| 2,742,332 A | * | 4/1956 | Cobb | 384/462 |
| 2,861,849 A | * | 11/1958 | Case | 384/530 |
| 3,539,231 A | * | 11/1970 | Langstrom | 384/470 |
| 3,674,356 A | * | 7/1972 | Zeneski | 384/470 |
| 3,743,369 A | * | 7/1973 | Langstrom | 384/470 |
| 4,626,113 A | * | 12/1986 | Forknall et al. | 384/530 |
| 4,732,496 A | * | 3/1988 | Shail | 384/526 |
| 4,902,145 A | * | 2/1990 | Johnson | 384/530 |
| 5,758,965 A | | 6/1998 | Gambrill et al. | 366/273 |
| 2002/0114550 A1 | * | 8/2002 | Daikuhara | 384/470 |
| 2002/0126927 A1 | * | 9/2002 | Compassi | 384/470 |

* cited by examiner

*Primary Examiner*—William C Joyce
(74) *Attorney, Agent, or Firm*—Baker & Hostetler LLP

(57) ABSTRACT

A bearing assembly and method includes a two-piece ball bearing retainer. The retainer has a first set of fluid passage apertures penetrating into ball bearing sockets, and has a supplemental set of fluid passage apertures penetrating from one side of the retainer to the other. The two halves can be snap fit together.

23 Claims, 6 Drawing Sheets

BEARING RETAINER ASSEMBLY AND METHOD

FIELD OF THE INVENTION

The invention pertains generally to the field of bearings, and more particularly, pertains to the field of ball bearings including, for example, those that are exposed to surrounding fluids. More particularly, the invention pertains to the field of bearing retainers used in ball bearing assembles.

BACKGROUND OF THE INVENTION

Ball bearings are in wide use in industry, and are used among other places in various processing equipment, including for example mixing devices. Ball bearings used in mixing devices are in many ways similar to other ball bearing arrangements, and for example typically have an inner ring having an outward-facing groove or race, an outer ring having an inward-facing groove or race, as well as a number of spherical ball elements which are trapped within the space between the two races to provide rolling contact.

It is often desirable for the balls to be evenly or at least relatively evenly spaced at circumferential angles around the circle defined by the races. In order to accomplish such even circumferential spacing, an item known as a bearing retainer is often used. The bearing retainer is generally some form of ring shaped device that sits freely in the space between the two races and has some features that interact with the balls in order to hold them in the proper position.

Also, the balls typically are sized such that during the assembly process if they were all in contact with each other, the balls would take up half or less than half of the circumferential space between the races. That is because during assembly of the bearing, typically the balls are placed in the lower half of the outer race leaving room for the inner race to be inserted, and then the balls are moved into a more evenly dispersed configuration at which point the inner ring is physically trapped in place so that it can rotate with respect to the outer ring but is otherwise axially located. In such an installation method, it has been common to have a bearing retainer that is simply inserted from one side of the bearing and has projections that project in between the balls and thus function to space the balls apart.

The above described type of bearing is in wide use in industry and has found applications in process equipment including, for example, mixing devices. In some types of mixing devices, the entire bearing assembly is typically packed with grease or some other lubricating material. The grease sits within the space between the rings and sits on the balls to some extent, and provides lubrication, particularly for the rolling contact along the races and also for the sliding contact that occurs between surfaces of the retainer and the balls themselves.

A relatively new type of application for ball bearing assemblies has arisen in the case of process equipment and mixing devices that have a clean-in-place feature. In these clean-in-place type devices, which are particularly popular, for example, in the biotechnology and other industries requiring highly sterile cleanable equipment, the various surfaces of the bearing itself are exposed to the material that is being processed. For example, in a biotechnology mixing device, the bearings may be exposed to the fluid that is being mixed or otherwise treated. This is referred to sometimes as a dry running situation. This can have some advantages, in that the fluid being mixed often has lubricating properties of its own, and therefore it provides to some extent the lubrication that would have otherwise been provided by the grease. Another attribute of some of these clean-in-place devices, is that between operation cycles, the device is cleaned with a cleaning and/or flushing fluid. The cleaning and/or flushing fluid, during this cycle, also comes into contact with the bearing surfaces and in such a way removes and rinses away the material that was being processed in the prior cycle. It is desirable that this clean-in-place process does an effective job of removing or flushing away the materials from the prior cycle, and also that when the cleaning or flushing material is drained or removed, that as little residue, if any, as possible be left behind on the bearing so that it does not contaminate the material in the next cycle.

The prior art bearings described above were developed for use in a grease lubricated (i.e. not dry running) type situation. It has been found that these bearings may not perform optimally in the context of a dry running and/or a clean-in-place application at least to some extent for several reasons. The lubricating properties of the material being mixed may not be as good as was present with the grease, and it has been found that some prior art bearing retainers may tend to jam under load due to the heavy friction. Further, since the above-described prior art retainers tend to engage the balls only from one side, the jamming effect can urge the retainer to the side where it eventually further wedges into a jammed position. Also, during the clean-in-place process, the prior art retainers may tend to inhibit at least to some extent fluid flow around the retainer and in particular inhibit fluid flow space between the races and around all sides of the balls.

In view of the foregoing, it would be desirable to have a bearing assembly and method including a bearing retainer that alleviates the above mentioned problems at least to some extent. Further, it would be desirable to have a bearing retainer that provides desirable bearing retainment and/or spacing qualities while also operating in a dry running application. Further, it would be desirable to have a bearing assembly that facilities flow of cleaning or rinsing solution around the retainer itself and the balls.

SUMMARY OF THE INVENTION

In some embodiments the invention provides a bearing assembly and method including a bearing retainer that alleviates the above mentioned problems at least to some extent, has desirable to have a bearing retainer that provides desirable bearing retainment qualities while also operating in a dry running application, and/or facilities flow of cleaning or flushing solution around the retainer itself and the balls.

In accordance with one embodiment of the present invention, a retainer for use in a bearing assembly comprises a generally circular body; a plurality of sockets disposed around the body; and a plurality of apertures penetrating from outside of the body into at least some of the sockets.

In accordance with another embodiment of the present invention, a retainer for use in a bearing assembly comprises a generally circular body, wherein the body is formed of two halves joined together; and a plurality of sockets disposed around the body.

In accordance with another embodiment of the present invention, a retainer for use in a ball bearing assembly comprises a generally circular shaped body; means for spacing the balls disposed around the body; and means for providing fluid passages each penetrating through the body from one side of the body to the sockets.

In accordance with another embodiment of the present invention, a retainer for use in a ball bearing assembly comprises a generally circular shaped body; means for spacing the balls disposed around the body; and means for providing fluid passages each penetrating through the body from one side of the body to the other side of the body.

In accordance with yet another embodiment of the present invention, a method for retaining balls in a bearing assembly, comprises, assembling a generally circular body, by attaching two halves so they joined together to form a single body; and assembling balls in a plurality of sockets disposed around the body.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

In some embodiments, the invention provides a bearing assembly and method including a bearing retainer that provides desirable bearing retainment qualities while also operating in a dry running application, and that facilities flow of cleaning or flushing solution around the retainer itself and the balls.

Figure 1:
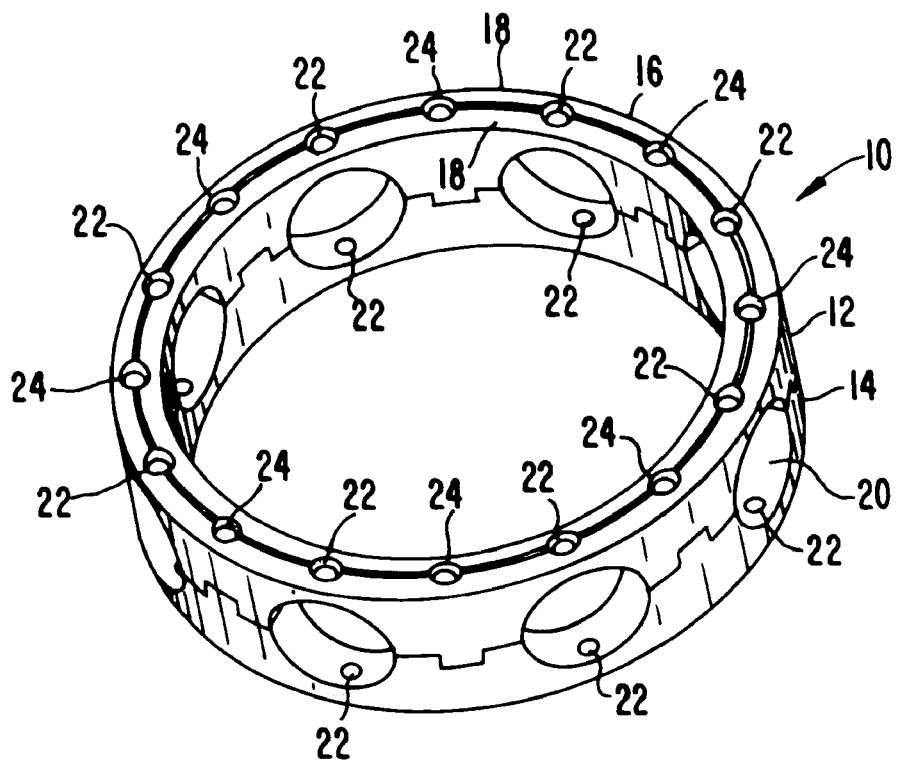
FIG. 1 is a perspective view of a bearing retainer according to a first preferred embodiment of the present invention.
Figure 2:
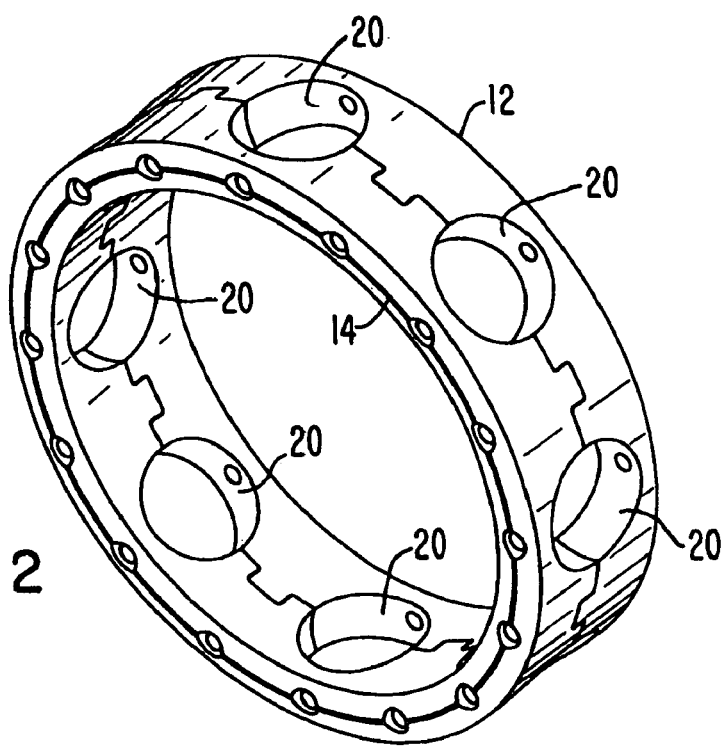
FIG. 2 is a perspective view of the bearing retainer shown in FIG. 1.

Preferred embodiments of the invention will now be described with reference to the drawing figures, in which like reference numerals refer to like parts throughout. Turning to FIGS. 1 and 2, a two piece bearing retainer 10 is illustrated having a first retainer half 12 and a second retainer half 14. The halves 12 and 14 can be made substantially identical to each other if desired. Each retainer half has an outer edge 16 which has a crowned profile. That is, the outer edge 16 has two bevel surfaces 18 forming a peaked arrangement. The retainer 10 also forms a plurality of ball engaging sockets 20 which have a generally spherical-conical outward facing shape. The retainer halves 12 and 14 are joined by a series of tongue and groove mating features snapped together, or any other connection, as will be described in other detail below.

As also seen in FIGS. 1 and 2, the bearing retainer 10 features a plurality of a first type of fluid flow apertures 22 each associated with the sockets 20. In addition to fluid flow apertures 22, a plurality of a second type of fluid flow apertures 24 are also provided which project completely through the finished retainer 10 at locations between the sockets 20.

Figure 4:
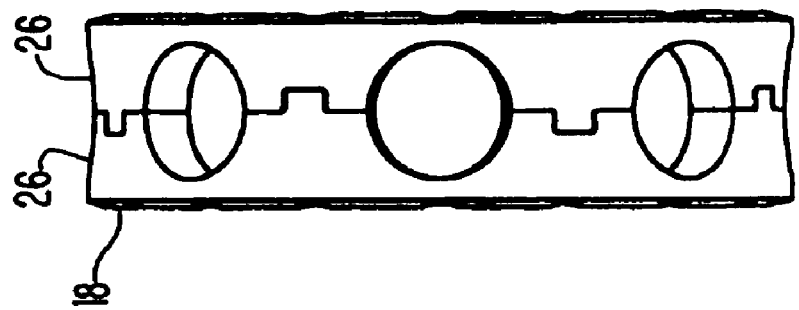
FIG. 4 is an end view of the bearing retainer of FIG. 1.
Figure 3:
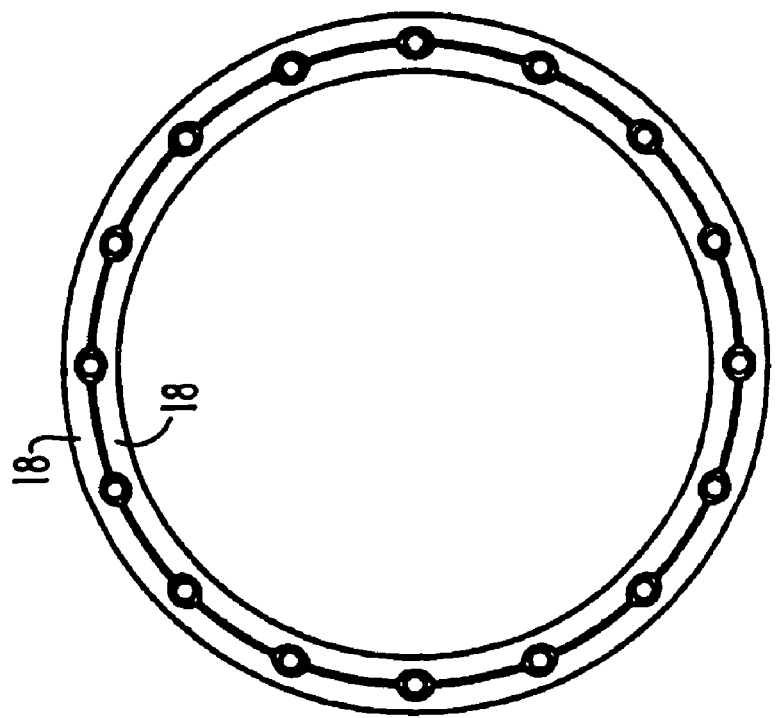
FIG. 3 is a plan view of the bearing retainer of FIG. 1.

Turning to FIGS. 3 and 4, the peaked outer edge 16 formed by the tapered sections 18 can be seen, and it can also be seen that the outer retainer surface 26 has a slightly concave profile surface shape. The peaked tapered sections 18 and the concave profile 26 are provided instead of flat surfaces in this preferred embodiment. The provision of the peaks 18 and/or concaved surface profile shape 26 can be advantages in certain circumstances. One example is that in case of a clean-in-place operation, after flushing these non-flat surfaces tend to resist the formation of drops, which on a flat surface may undesirably remain to contaminate the next cycle of material being processed, or which may evaporate but leave behind an undesirable residue.

Figure 5:
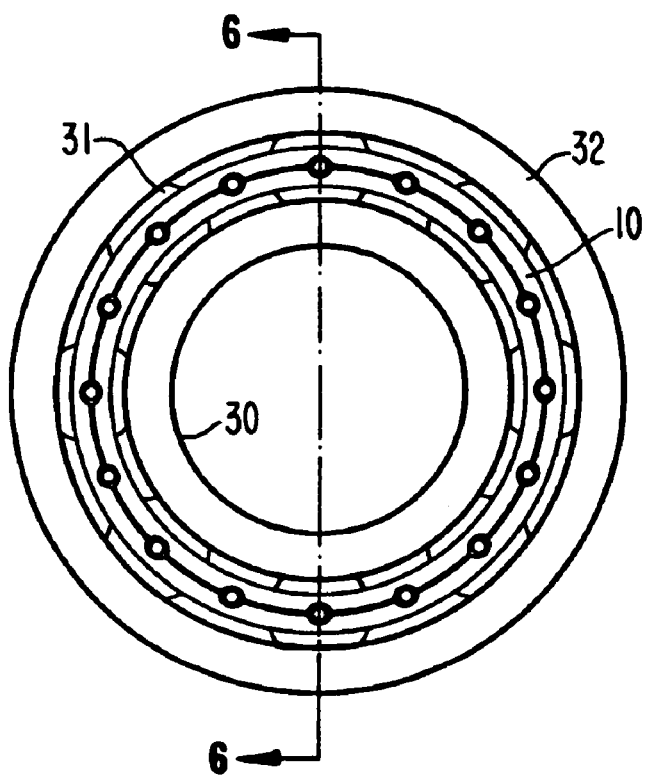
FIG. 5 is a plan view of an assembled bearing unit including an inner ring, an outer ring, a bearing retainer, and a plurality of ball bearings in accordance with a second preferred embodiment of the invention.
Figure 6:
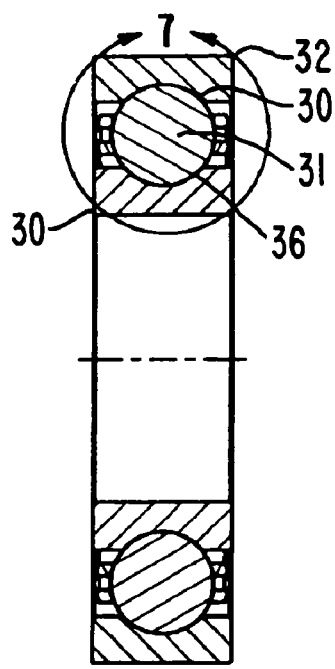
FIG. 6 is a cross-sectional view taken through line 6-6 in FIG. 5.

FIGS. 5 and 6 show a completed and operational bearing assembly including an inner ring 30 and an outer ring 32. A plurality of individual balls 31 are riding between a groove or race 36 on the outer surface of the inner ring 30 and a groove or race 38 provided on an inner surface on the outer ring 32. The balls 31 are held in an evenly spaced arrangement around the circumference of the bearing by the retainer 10. It will be appreciated that when one of the rings 30 or 32 rotates relative to the other ring, the balls 31 will essentially have rolling contact in the races 36 and 38, while having some degree of sliding contact with the spherical socket surfaces 20 of the retainer 10. The retainer 10 will thus rotate at approximately half the speed of the relative speed of rotation occurring between the inner and outer rings 30 and 32.

Figure 7:
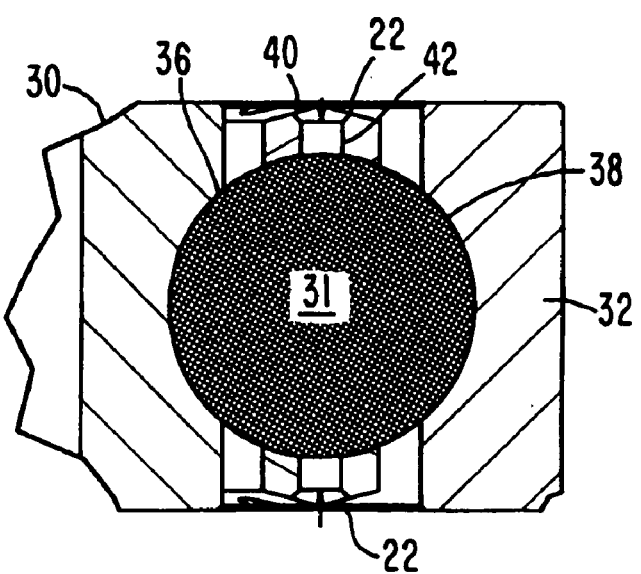
FIG. 7 is a detailed view taken in the region indicated by the arrow circle 7-7 in FIG. 6.

FIG. 7 is a detailed view showing a ball 31 in between the two races 36 and 38 and illustrates in greater detail the particular shape of the first type of fluid passage portions 22. In particular, the fluid passage portions 22 have a somewhat countersunk outer opening 40 leading to a cylindrical bore 42. The countersinking 40, if provided, avoids the sharp edge that would otherwise be present. It will be appreciated that, during the cleaning cycle, fluid contacts the balls 31 through a volume area on both sides of the retainers, and also contacts the balls 31 through the volume area provided by the bore 42. In the illustrated example, the volume area is increased by approximately 50% or more by the addition of the volume area provided by the bore 42. When cleaning and/or flushing solution is present and the ball is rotating, this can greatly facilitate cleaning of the bearing, retainer and surrounding areas.

Turning back to FIG. 5, it will be appreciated that the second type of fluid passages 24 generally facilitate the passage of fluid from one side of the bearing retainer 10 to the other side.

Figure 8:
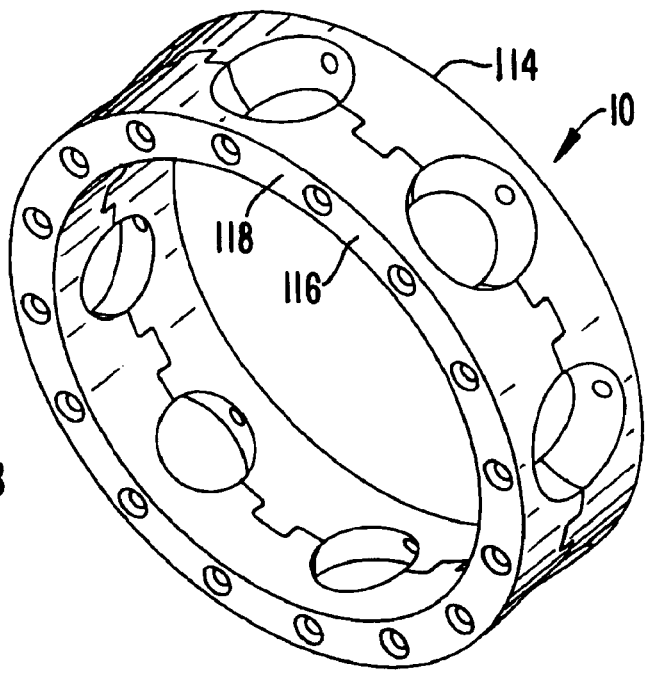
FIG. 8 is a perspective view similar to FIG. 2 but showing a second preferred embodiment of a bearing retainer.

FIG. 8 illustrates an alternate embodiment of the invention also having a retaining ring 10 made of up two halves 112 and 114. However in this embodiment, the end 118 is flat rather then being beveled as in the first embodiment. In other respects these two embodiments are similar.

Referring to the embodiments of both FIGS. 1 and 8, these preferred embodiments also feature a two piece construction. That is, the retaining ring 10 is split down its central axis into two halves 12 and 14 (or 112 and 114) which are joined together.

The feature of splitting the retainer ring 10 in two pieces facilitates its installation. That is, after the balls 31 are put into the outer race 38 and grouped together, and the inner ring 30 is inserted, and the balls 31 are redistributed, thereby locking the two rings 30 and 32 together around the balls 31, one retainer half can be inserted from each side of the bearing and the two retainer halves can be attached together to trap the balls 31 between them in the spherical sockets 20 to provide the joined two piece retaining ring 10.

In the illustrated preferred embodiment, the halves 12 and 14 are joined together via a snap fit. Further in this example, the snap fit is provided by an alternating tongue and groove fit located at intervals between each of sockets. The tongue and groove fits are provide by an alternating set of grooves 50 and tongues 52 having a complimentary snap together shape.

Figure 11:
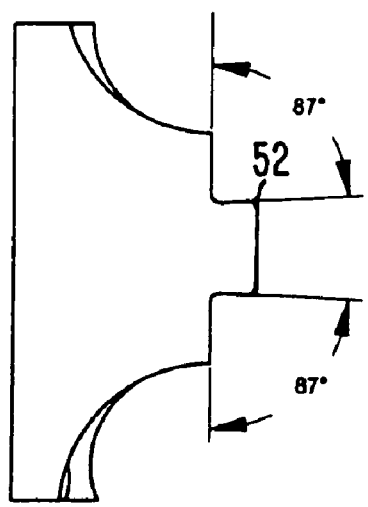
FIG. 11 is a cut away detail view showing a mating tongue on a bearing ring half.
Figure 10:
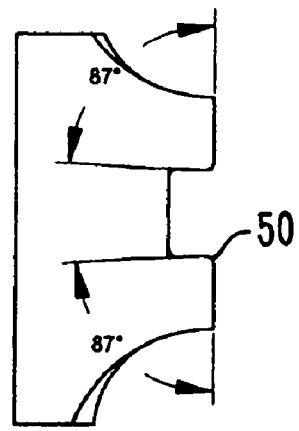
FIG. 10 is a cut away view showing a detail of a mating groove on a bearing ring half.
Figure 13:
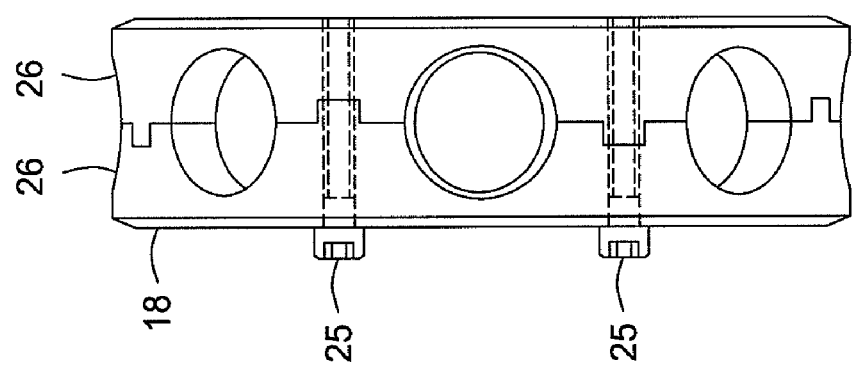
FIG. 13 is a side view of the bearing retainer shown in FIG. 1, showing threaded fasteners received in supplemental apertures.
Figure 14:
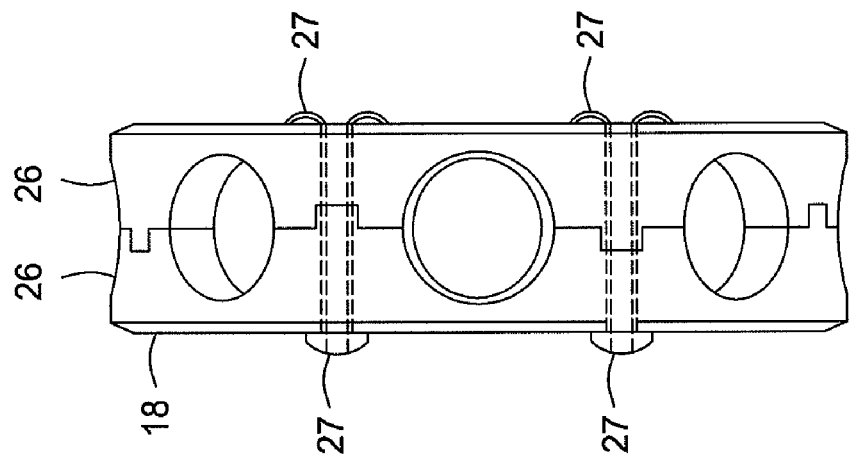
FIG. 14 is a side view of the bearing retainer shown in FIG. 1, showing rivets received in supplemental apertures.

FIG. 10 illustrates in more detail the inwardly tapered shape of a groove 50. FIG. 11 illustrates in more detail the complimentary outward tapered shape of a tongue 52. Since the retaining ring 10 is made of a somewhat resilient elastic material, the material is able to flex efficiently during a snap together in response to an installation force, but also to retain a sufficiently snap locking fit to maintain integrity during operation. Although a tongue and groove fit is given as an example of a snap fit, other types of snap fit may be used. Further, other joining methods instead of snap fitting may be used. In certain circumstances it is appropriate to join the rings using mechanical fasteners and/or other bonding methods. In one alternative embodiment, the locations having the flow through apertures 24 instead are used to receive a threaded screw type fastener 25. In another embodiment, the flow through apertures 24 are adapted to receive a rivet 27 there through to hold the two pieces 12 and 14 together. In one preferred embodiment, the rivet 27 can be a hollow rivet to affect the fastening and also provide flow through characteristics through the hollow rivet. FIG. 13 depicts an assembled configuration including threaded fasteners 25 located in the supplemental apertures 24, thus illustrating the configuration described above where the flow through apertures 24 instead are used to receive a threaded screw type fastener 25. FIG. 14 illustrates a configuration where a rivet 27 is received in the flow through apertures 24. Although a solid rivet can be used, as explained above, the rivet 27 can optionally be a hollow rivet.

Figure 9:
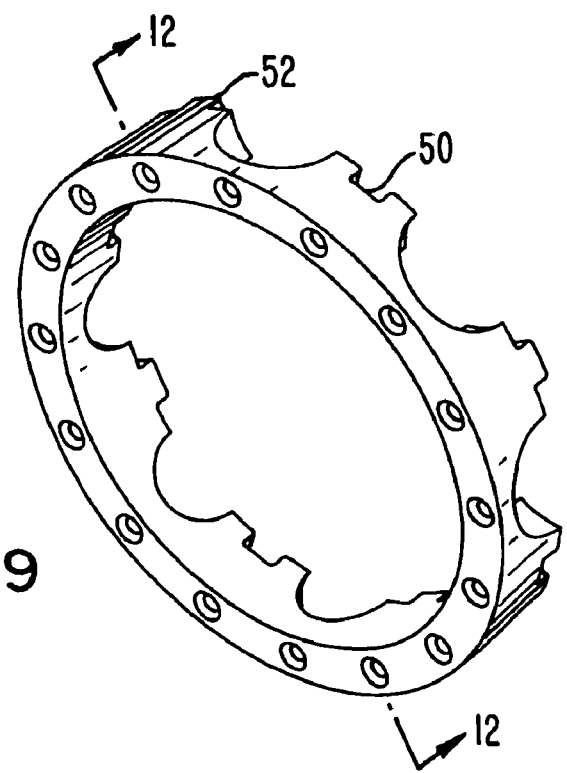
FIG. 9 is a perspective view of a half the bearing retainer shown in FIG. 8.
Figure 12:
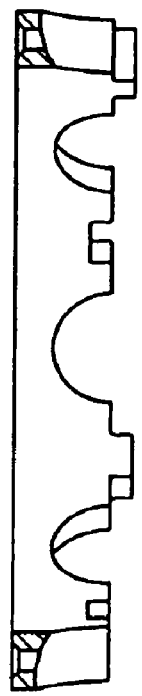
FIG. 12 is a cross-sectional view of the embodiment of FIG. 9 taken through line 12-12 in FIG. 9.

FIG. 12 is a cross-sectional view taken through FIG. 9 further illustrating tongues, grooves, sockets and the flow through apertures 22.

In a case where alternating tongues and grooves are provided, the two halves 12 and 14 can be made substantially identical to each other. In the case of other joining operations, the halves can also be made identical to each other. However, in some applications it may be preferable to have the halves be non-identical.

The inner and outer rings are made of any suitable material, but in many applications are typically made of stainless steel or another metal alloy. The ball bearings are typically ceramic, and for example, silicon nitride ceramic is one preferred material. The retainer may also be made of any suitable material but in some applications it is preferred that the retainer be made of a material such as, for example, glass filled Teflon, Nylon, Teflon, another plastic material, or other materials.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A retainer for use in a bearing assembly, the retainer comprising:
   a generally circular body, comprising two halves, each half having alternating grooves and tongues;
   a plurality of sockets disposed around the body, each circumferentially located between a groove and a tongue;
   a plurality of apertures penetrating from outside of the body into at least some of the sockets; and
   a plurality of supplemental apertures penetrating through the body from one side of the body to the other at the circumferential locations of the grooves and tongues, wherein the halves can be snapped together with respective grooves and tongues on one half engaging respective tongues and grooves on the other half to releasably join the halves, and wherein when the halves are joined the supplemental apertures on each half are then aligned in opposed pairs to each receive a fastener passing through the opposed supplemental aperture on each half, to provide supplemental attachment of the halves together.

2. A retainer according to claim 1, wherein the sockets penetrate through the body.

3. A retainer according to claim 1, wherein the sockets are outward facing.

4. A retainer according to claim 1, wherein the sockets have a truncated spherical surface.

5. A retainer according to claim 1, wherein the alternating grooves and tongues on one half have a substantially identical configuration to the grooves and tongues on the other half.

6. A retainer according to claim 5, wherein the two halves are substantially identical to each other.

7. A retainer according to claim 1, wherein the fasteners are each a threaded fastener.

8. A retainer according to claim 1, wherein the fasteners are each a rivet.

9. A retainer for use in a bearing assembly, the retainer comprising:
   a generally circular body, comprising two halves, each half having alternating grooves and tongues;

a plurality of sockets disposed around the body and circumferentially located between a groove and a tongue; and a plurality of supplemental apertures penetrating through the body from one side of the body to the other at the circumferential locations of the grooves and tongues, wherein the halves can be snapped together with respective grooves and tongues on one half engaging respective tongues and grooves on the other half to releasably join the halves, and wherein when the halves are joined the supplemental apertures on each half are then aligned in opposed pairs to each receive a fastener passing through the supplemental aperture on each half, to provide supplemental attachment of the halves together.

10. A retainer according to claim 9, wherein the alternating grooves and tongues on one half have a substantially identical configuration to the grooves and tongues on the other half.

11. A retainer according to claim 10, wherein the two halves are substantially identical to each other.

12. A retainer according to claim 9, wherein the fasteners are each a threaded fastener.

13. A retainer according to claim 9, wherein the fasteners are each a rivet.

14. A retainer for use in a ball bearing assembly, the retainer comprising:
a generally circular shaped body, comprising two halves, each half having alternating grooves and tongues;
means for spacing the balls disposed around the body and circumferentially located between a groove and a tongue;
means for providing fluid passages each penetrating through the body from one side of the body to the sockets; and
a plurality of supplemental means for providing fluid passages each penetrating through the body from one side of the body to the other at the circumferential locations of the grooves and tongues, wherein the halves can be snapped together with respective grooves and tongues on one half engaging respective tongues and grooves on the other half to releasably join the halves, and wherein when the halves are joined the supplemental apertures on each half are then aligned in opposed pairs to each receive a fastener passing through the opposed supplemental aperture on each half, to provide supplemental attachment of the halves together.

15. A retainer according to claim 14, wherein the alternating grooves and tongues on one half have a substantially identical configuration to the grooves and tongues on the other half.

16. A retainer according to claim 15, wherein the two halves are substantially identical to each other.

17. A retainer according to claim 14, wherein the fasteners are each a threaded fastener.

18. A retainer according to claim 14, wherein the fasteners are each a rivet.

19. A kit for use in a bearing assembly, the kit comprising:
a retainer comprising:
a generally circular body, comprising two halves, each half having alternating grooves and tongues;
a plurality of sockets disposed around the body, each circumferentially located between a groove and a tongue;
a plurality of apertures penetrating from outside of the body into at least some of the sockets; and
a plurality of supplemental apertures penetrating through the body from one side of the body to the other at the circumferential locations of the grooves and tongues, wherein the halves can be snapped together with respective grooves and tongues on one half engaging respective tongues and grooves on the other half to releasably join the halves, and wherein when the halves are joined the supplemental apertures on each half are then aligned in opposed pairs to each receive a fastener passing through the opposed supplemental aperture on each half to provide supplemental attachment of the halves together.

20. A retainer according to claim 19, wherein the alternating grooves and tongues on one half have a substantially identical configuration to the grooves and tongues on the other half.

21. A retainer according to claim 20, wherein the two halves are substantially identical to each other.

22. A retainer according to claim 19, wherein the fasteners are each a threaded fastener.

23. A retainer according to claim 19, wherein the fasteners are each a rivet.

* * * * *